(12) United States Patent
Baskins et al.

(10) Patent No.: US 6,654,760 B2
(45) Date of Patent: Nov. 25, 2003

(54) SYSTEM AND METHOD OF PROVIDING A CACHE-EFFICIENT, HYBRID, COMPRESSED DIGITAL TREE WITH WIDE DYNAMIC RANGES AND SIMPLE INTERFACE REQUIRING NO CONFIGURATION OR TUNING

(75) Inventors: Douglas L. Baskins, Fort Collins, CO (US); Alan Silverstein, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 248 days.

(21) Appl. No.: 09/874,586

(22) Filed: Jun. 4, 2001

(65) Prior Publication Data

US 2003/0061227 A1 Mar. 27, 2003

(51) Int. Cl.⁷ .............................................. G06F 17/30
(52) U.S. Cl. ...................................... 707/101; 707/102
(58) Field of Search ................................ 707/1, 3, 4, 5, 707/6, 100, 101, 102; 341/50, 51; 364/251.6, 282.6; 395/600

(56) References Cited

U.S. PATENT DOCUMENTS

| | | | |
|---|---|---|---|
| 5,530,957 A | 6/1996 | Koenig | |
| 5,557,786 A | 9/1996 | Johnson, Jr. | |
| 5,701,467 A | 12/1997 | Freeston | |
| 5,829,004 A | 10/1998 | Au | |
| 5,930,805 A | 7/1999 | Marquis | |
| 5,974,411 A | * 10/1999 | McCool et al. | 707/3 |
| 5,987,468 A | 11/1999 | Singh et al. | |
| 6,041,053 A | 3/2000 | Dounceur et al. | |
| 6,067,574 A | 5/2000 | Tzeng | |
| 6,470,344 B1 | 10/2002 | Kothuri et al. | |
| 6,505,206 B1 | * 1/2003 | Tikkanen et al. | 707/101 |

OTHER PUBLICATIONS http://www.geocities.com/SiliconValley/4942/arrays.html—DynamicArray Routines (6 Pages). Printed Jul. 18, 2001.
Horowitz, Ellis and Sahni Sartaj, "Fundamentals of Data Structure in Pascal," W.H. Freeman and Company, 4th Ed., New York. (1994) 582–595.
Knuth, Donald E., "The Art of Computer Programming," Addison–Wesley Publishing Company. Reading, MA. (1973) 490–493.

(List continued on next page.)

*Primary Examiner*— Charles Rones

(57) ABSTRACT

An adaptive digital tree data structure incorporates a rich pointer object, the rich pointer including both conventional address redirection information used to traverse the structure and supplementary information used to optimize tree traversal, skip levels, detect errors, and store state information. The structure of the pointer is flexible so that, instead of storing pointer information, data may be stored in the structure of the pointer itself and thereby referenced without requiring further redirection. The digital tree data structure is self-modifying based on a digital tree (or "trie") data structure which is stored in the memory, can be treated as a dynamic array, and is accessed through a root pointer. For an empty tree, this root pointer is null, otherwise it points to the first of a hierarchy of branch nodes of the digital tree. Low-fanout branches are avoided or replaced with alternative structures that are less wasteful of memory while retaining most or all of the performance advantages of a conventional digital tree structure, including index insertion, search, access and deletion performance. This improvement reduces or eliminates memory otherwise wasted on null pointers prevalent in sparsely populated and/or unbalanced, wide/shallow digital trees. Additional processing time required to effectuate and accommodate the branch modification is minimal, particularly in comparison to processing advantages inherent in reducing the size of the structure so that data fetching from memory is more efficient, capturing more data and fewer null pointers.

19 Claims, 11 Drawing Sheets

OTHER PUBLICATIONS

Sedgewick, Robert. "Algorithms in C," Addison–Wesley Publishing Company, Reading, MA. (1990) 245–258, 265–271, 373–386.

Acharya, Anurag, Huican Zhu, and Kai Shen. "Adaptive Algorithms for Cache–efficient Trie Search." University of California, Santa Barbara, CA. 1–11.

Bentley, Jon and Robert Sedgewick. "Fast Algorithms for Sorting and Searching Strings." 360–369.

Bentley, Jon and Robert Sedgewick. "Ternary Search Trees." Dr. Dobb's Journal. (Apr. 1998) 1–8.

Ai–suwaiyel, M. and Ellis Horowitz. "Algorithms for Trie Compaction." ACM Transactions on Database Systems, Vol 9, No. 2. (Jun. 1984) 243–263.

Doeringer, Willibald, Gunter Karjoth and Mahdi Nassehi. "Routing on Longest–Matching Prefixes." IEEE/ACM Transactions on Networking, vol. 4, No. 1. (Feb. 1996). 86–97.

Reznik, Yuriy, A. "Some results on Tries with Adaptive Branching." 6th Annual International Conference, COCOON (2000) 148–158.

Knott, Gary D. "Fixed–Bucket Binary Storage Trees" Journal of Algorithms 3, (1982) 276–287.

Luccio, Fabrizio, Mirelle Regnier, Rene Schott. "Discs and Other Related Data Structure," Workshop WADS. (Aug. 1989). 192–205.

Clement, J. P. Flajolet, and B. Vallee. "Dynamical Sources in Information Theory: A general Analysis of Trie Structures," Algorithmica. (2001). 307–369.

Merrett, T. H., Heping Shang, and Xiaoyan Zhao. "Database Structures, Based on Tries, for Text, Spatial, and General Data." School of COmputer Science, McGill University. 1–11.

Bentley, Jon L. "Multidimensional Binary Search Trees Used for Associative Searching." Association for Computing Machinery, Inc. Vo. 18. No. 9. (Sep. 1975) 509–517.

Jacquet, Philipe and Wojciech Szpankowski. "What we can learn about Suffix Trees from Independent Tries." WADS. (Aug. 1991). 228–239.

Nilsson, Stefan and Matti Tikkanen. "An experimental study of Compression Methods for dynamic Tries." 1–21.

Martinez, Conrad, et al. "Partial match queries in relaxed multidimensional search trees." Austrian–Spanish Scientific Exchange Program. (Sep. 28, 1998). 1–24.

Rais, Bonita, et al. "Typical Behavior of Patricia Tries." Allerton Conference on Communications, Control, and Computing. (Oct. 1990). 924–925.

Kirschenhofer, Peter, et al. "Do we really need to Balance Patricia Tries?" National Science Foundation. 302–316.

Procopiuc, Octavian. "Data Structures for Spatial Systems."(May 12, 1997). 1–20.

* cited by examiner

| FIG. 1A | FIG. 1B |
|---------|---------|
| FIG. 1C | FIG. 1D |
| FIG. 1E |         |

*FIG. 1*

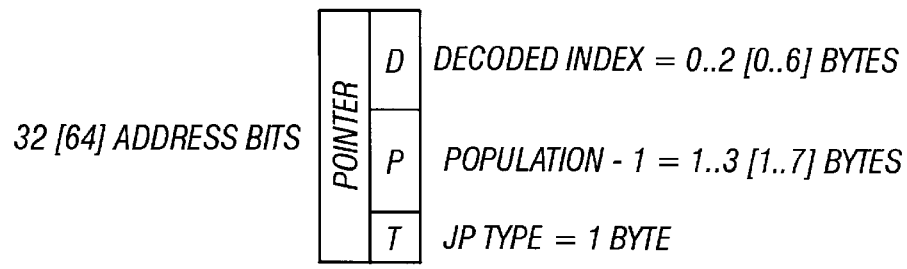
FIG. 2A
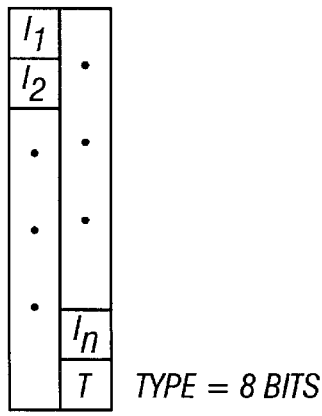
FIG. 2B
| NumRP=4 | E1 | E2 | E3 |
|---|---|---|---|
| E4 | | | |
| RICH POINTER FOR EXPANSE 1 (E1) | | | |
| RICH POINTER FOR EXPANSE 2 (E2) | | | |
| RICH POINTER FOR EXPANSE 3 (E3) | | | |
| RICH POINTER FOR EXPANSE 4 (E4) | | | |
| | | | |
| | | | |
| | | | |
FIG. 3

4 INDEXES, 3 BYTES EACH:

5 INDEXES, 2 BYTES EACH:

8 INDEXES, 1 BYTES EACH:

9 INDEXES, 1 BYTES EACH:

2 INDEXES, 3 BYTES EACH:

2 INDEXES, 2 BYTES EACH:

7 INDEXES, 1 BYTES EACH:

SYSTEM AND METHOD OF PROVIDING A CACHE-EFFICIENT, HYBRID, COMPRESSED DIGITAL TREE WITH WIDE DYNAMIC RANGES AND SIMPLE INTERFACE REQUIRING NO CONFIGURATION OR TUNING

RELATED APPLICATIONS

This present application is related to co-pending, commonly assigned, and concurrently filed U.S. application Ser. No. 09/874,468, now pending, entitled "SYSTEM AND METHOD FOR DATA COMPRESSION IN A *VALUELESS' DIGITAL TREE REPRESENTING A BITSET"; U.S. application Ser. No. 09/874,654, now pending, entitled "SYSTEM FOR AND METHOD OF EFFICIENT, EXPANDABLE STORAGE AND RETRIEVAL OF SMALL DATASETS"; and U.S. application Ser. No. 09/874,788, now pending, entitled "SYSTEM FOR AND METHOD OF CACHE-EFFICIENT DIGITAL TREE WITH RICH POINTERS," the disclosures of which are hereby incorporated herein by reference.

TECHNICAL FIELD

The present invention relates generally to the field of data structures, and more particularly to a hierarchical data organization in which the structure of the data organization is dependent on the data stored, with components of the data structure compressed to match the data.

BACKGROUND

Computer processors and associated memory components continue to increase in speed. As hardware approaches physical speed limitations, however, other methods for generating appreciable decreases in data access times are required. Even when such limitations are not a factor, maximizing software efficiency maximizes the efficiency of the hardware platform, extending the capabilities of the hardware/software system as a whole. One method of increasing system efficiency is by providing effective data management, achieved by the appropriate choice of data structure and related storage and retrieval algorithms. For example, various prior art data structures and related storage and retrieval algorithms have been developed for data management including arrays, hashing, binary trees, AVL trees (height-balanced binary trees), b-trees, and skiplists. In each of these prior art data structures and related storage and retrieval algorithms an inherent trade-off has existed between providing faster access times and providing lower memory overhead. For example, an array allows for fast indexing through the calculation of the address of a single array element but requires the pre-allocation of the entire array in memory before a single value is stored, and unused intervals of the array waste memory resources. Alternatively, binary trees, AVL trees, b-trees and skiplists do not require the pre-allocation of memory for the data structure and attempt to minimize allocation of unused memory but exhibit an access time which increases as the population increases.

An array is a prior art data structure which has a simplified structure and allows for rapid access of the stored data. However, memory must be allocated for the entire array and the structure is inflexible. An array value is looked up "positionally", or "digitally", by multiplying the index by the size (e.g., number of bytes) allocated to each element of the array and adding the offset of the base address of the array. Typically, a single Central Processing Unit (CPU) cache line fill is required to access the array element and value stored therein. As described and typically implemented, the array is memory inefficient and relatively inflexible. Access, however, is provided as O(1), i.e., independent of the size of the array (ignoring disk swapping).

Alternatively, other data structures previously mentioned including binary trees, b-trees, skiplists, linked lists and hash tables, are available which are more memory efficient but include undesirable features. For example, hashing is used to convert sparse, possibly multi-word indexes (such as strings) into array indexes. The typical hash table is a fixed-size array, and each index into it is the result of a hashing algorithm performed on the original index. However, in order for hashing to be efficient, the hash algorithm must be matched to the indexes which are to be stored. Hash tables also require every data node to contain a copy of (or a pointer to) the original index (key) so you can distinguish nodes in each synonym chain (or other type of list). Like an array, use of hashing requires some preallocation of memory, but it is normally a fraction of the memory which must be allocated for a flat array, if well designed, i.e., the characteristics of the data to be stored are well known, behaved and matched to the hashing algorithm, collision resolution technique and storage structure implemented.

In particular, digital trees, or tries, provide rapid access to data, but are generally memory inefficient. Memory efficiency may be enhanced for handling sparse index sets by keeping tree branches narrow, resulting in a deeper tree and an increase in the average number of memory references, indirections, and cache line fills, all resulting in slower access to data. This latter factor, i.e., maximizing cache efficiency, is often ignored when such structures are discussed yet may be a dominant factor affecting system performance. A trie is a tree of smaller arrays, or branches, where each branch decodes one or more bits of the index. Most prior art digital trees have branch nodes that are arrays of simple pointers or addresses. Typically, the size of the pointers or addresses are minimized to improve the memory efficiency of the digital tree.

At the "bottom" of the digital tree, the last branch decodes the last bits of the index, and the element points to some storage specific to the index. The "leaves" of the tree are these memory chunks for specific indexes, which have application-specific structures.

Digital trees have many advantages including not requiring memory to be allocated to branches which have no indexes or zero population (also called an empty subexpanse). In this case the pointer which points to the empty subexpanse is given a unique value and is called a null pointer indicating that it does not represent a valid address value. Additionally, the indexes which are stored in a digital tree are accessible in sorted order which allows identification of neighbors. An "expanse" of a digital tree as used herein is the range of values which could be stored within the digital tree, while the population of the digital tree is the set of values that are actually stored within the tree. Similarly, the expanse of a branch of a digital tree is the range of indexes which could be stored within the branch, and the population of a branch is the number of values (e.g., count) which are actually stored within the branch. (As used herein, the term "population" refers to either the set of indexes or the count of those indexes, the meaning of the term being apparent to those skilled in the art from the context in which the term is used.)

"Adaptive Algorithms for Cache-Efficient Trie Search" by Acharya, Zhu and Shen (1999), the disclosure of which is hereby incorporated herein by reference, describes cache-efficient algorithms for trie search. Each of the algorithms use different data structures, including a partitioned-array, B-tree, hashtable, and vectors, to represent different nodes in a trie. The data structure selected depends on cache characteristics as well as the fanout of the node. The algorithms further adapt to changes in the fanout at a node by dynamically switching the data structure used to represent the node. Finally, the size and the layout of individual data structures is determined based on the size of the symbols in the alphabet as well as characteristics of the cache(s). The publication further includes an evaluation of the performance of the algorithms on real and simulated memory hierarchies.

Other publications known and available to those skilled in the art describing data structures include *Fundamentals of Data Structures in Pascal*, 4th Edition; Horowitz and Sahni; pp 582–594; *The Art of Computer Programming*, Volume 3; Knuth; pp 490–492; Algorithms in C; Sedgewick; pp 245–256, 265–271; "Fast Algorithms for Sorting and Searching Strings"; Bentley, Sedgewick; "Ternary Search Trees"; 5871926, INSPEC Abstract Number: C9805-6120-003; Dr Dobb's Journal; "Algorithms for Trie Compaction", ACM Transactions on Database Systems, 9(2):243–63, 1984; "Routing on longest-matching prefixes"; 5217324, INSPEC Abstract Number: B9605-6150M-005, C9605-5640-006; "Some results on tries with adaptive branching"; 6845525, INSPEC Abstract Number: C2001-03-6120-024; "Fixed-bucket binary storage trees"; 01998027, INSPEC Abstract Number: C83009879; "DISCS and other related data structures"; 03730613, INSPEC Abstract Number: C90064501; and "Dynamical sources in information theory: a general analysis of trie structures"; 6841374, INSPEC Abstract Number: B2001-03-6110-014, C2001-03-6120-023, the disclosures of which are hereby incorporated herein by reference.

An enhanced storage structure is described in U.S. patent application Ser. No. 09/457,164 filed Dec. 8, 1999, entitled "A FAST EFFICIENT ADAPTIVE, HYBRID TREE," (the '164 application) assigned in common with the instant application and incorporated herein by reference in its entirety. The data structure and storage methods described therein provide a self-adapting structure which self-tunes and configures "expanse" based storage nodes to minimize storage requirements and provide efficient, scalable data storage, search and retrieval capabilities. The structure described therein, however, does not take full advantage of certain sparse data situations.

An enhancement to the storage structure described in the '164 application is detailed in U.S. patent application Ser. No. 09/725,373, filed Nov. 29, 2000, entitled "A DATA STRUCTURE AND STORAGE AND RETRIEVAL METHOD SUPPORTING ORDINALITY BASED SEARCHING AND DATA RETRIEVAL", assigned in common with the instant application and incorporated herein by reference in its entirety. This latter application describes a data structure and related data storage and retrieval method which rapidly provides a count of elements stored or referenced by a hierarchical structure of ordered elements (e.g., a tree), access to elements based on their ordinal value in the structure, and identification of the ordinality of elements. In an ordered tree implementation of the structure, a count of indexes present in each subtree is stored, i.e., the cardinality of each subtree is stored either at or associated with a higher level node pointing to that subtree or at or associated with the head node of the subtree. In addition to data structure specific requirements (e.g., creation of a new node, reassignment of pointers, balancing, etc.) data insertion and deletion includes steps of updating affected counts. Again, however, the structure fails to take full advantage of certain sparse data situations.

Accordingly, a need exists for techniques and tools to optimize performance characteristics of digital tree and similar structures.

SUMMARY OF THE INVENTION

A system and data structure according to the present invention include a self-modifying data structure based on a digital tree (or "trie") data structure which is stored in the memory, can be treated as a dynamic array, and is accessed through a root pointer. For an empty tree, this root pointer is null, otherwise it points to the first of a hierarchy of branch nodes of the digital tree. Low-fanout branches are avoided or replaced with alternative structures that are less wasteful of memory while retaining most or all of the performance advantages of a conventional digital tree structure, including index insertion, search, access and deletion performance. This improvement reduces or eliminates memory otherwise wasted on null pointers prevalent in sparsely populated and/or wide/shallow digital trees. Additional processing time required to effectuate and accommodate the branch modification is minimal, particularly in comparison to processing advantages inherent in reducing the size of the structure so that data fetching from memory is more efficient, capturing more data and fewer null pointers in each CPU cache line fill. The invention includes linear and bitmap branches and leaves implemented, for example, using a rich pointer structure. Opportunistic reconfiguration of nodes automatically readjusts for changing subexpanse population.

BRIEF DESCRIPTION OF THE DRAWINGS

FIG. 2A is a generalized diagram of an adaptable object or "rich pointer";

FIG. 2B is a generalized diagram of a rich pointer incorporating immediate storage of indexes;

FIG. 3 is a diagram of an example of a linear branch;

DETAILED DESCRIPTION

Figure 1A:
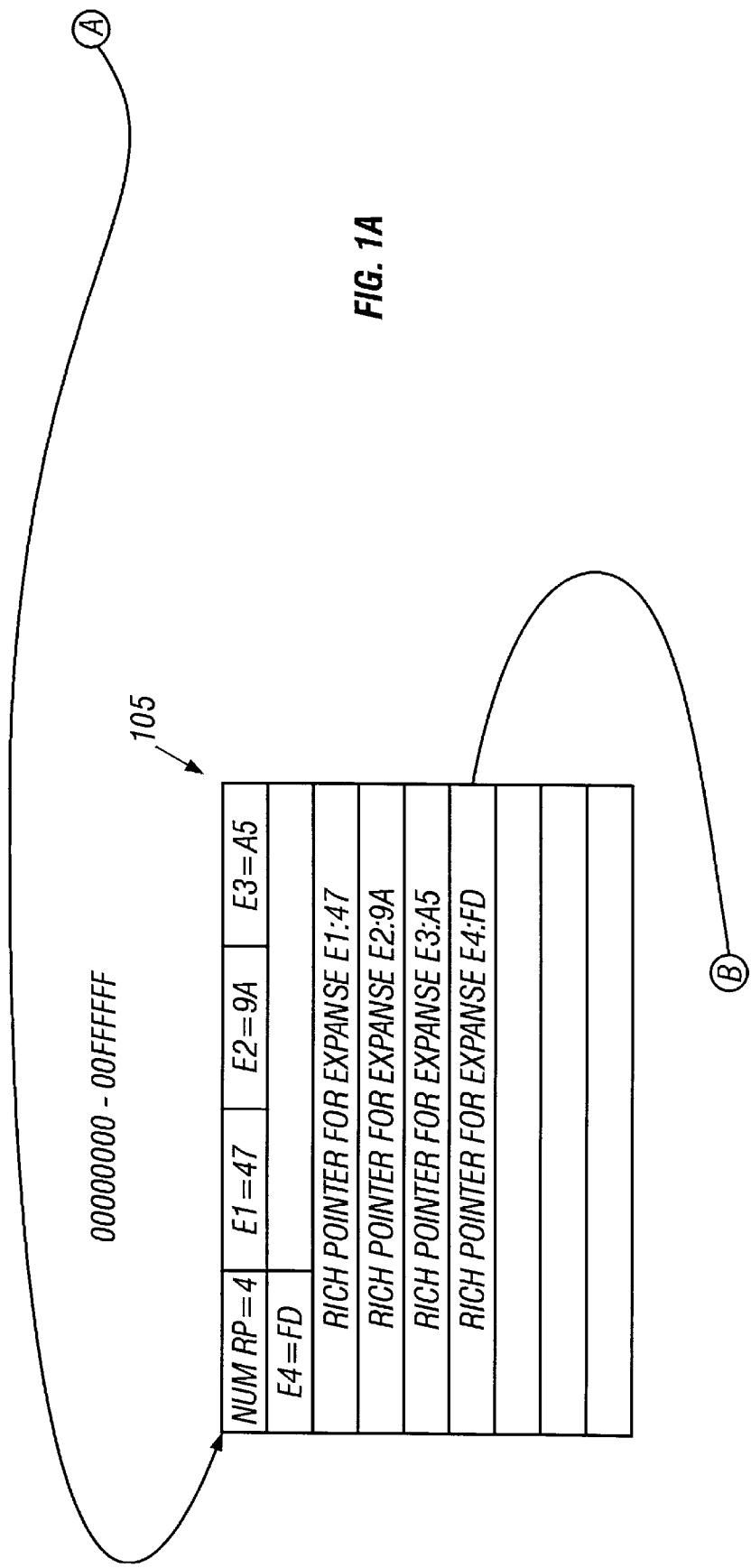
FIGS. 1A–1E are a diagram of an example of a digital tree which incorporates hybrid abstract data type data structures (ADTs) according to the invention to maximize memory utilization efficiency while minimizing index access time.
Figure 1B:
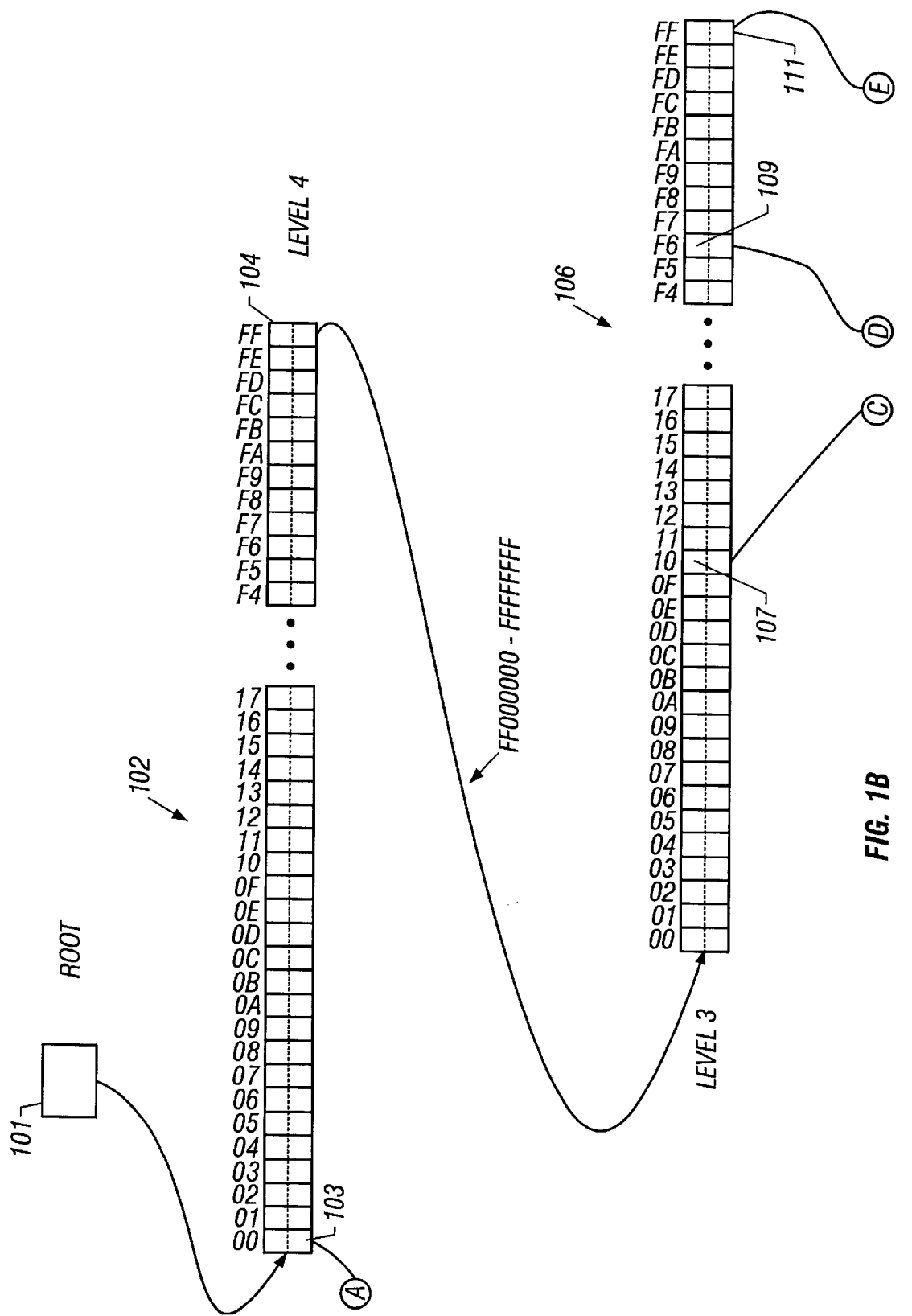
Figure 1C:
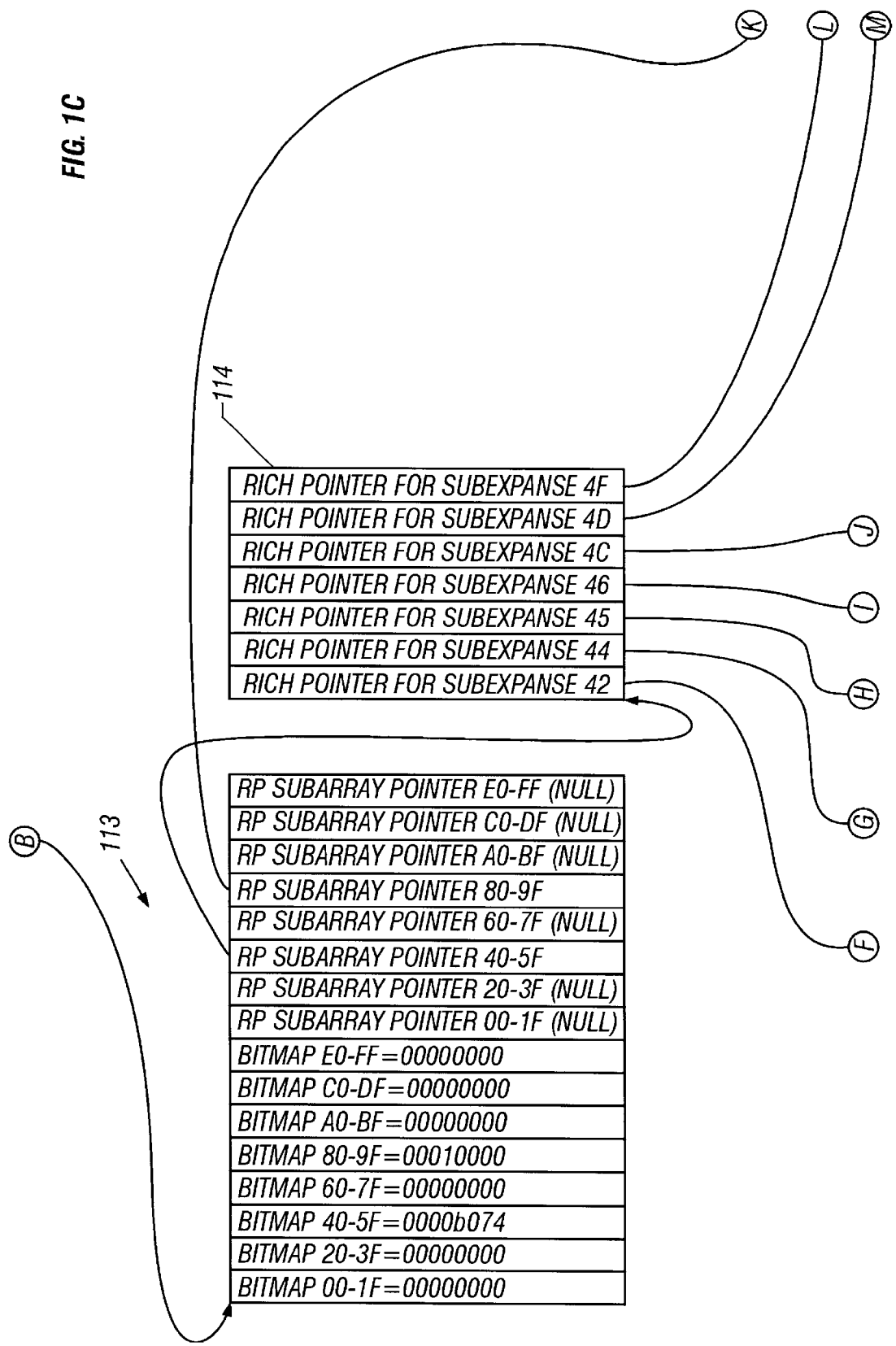
Figure 1D:
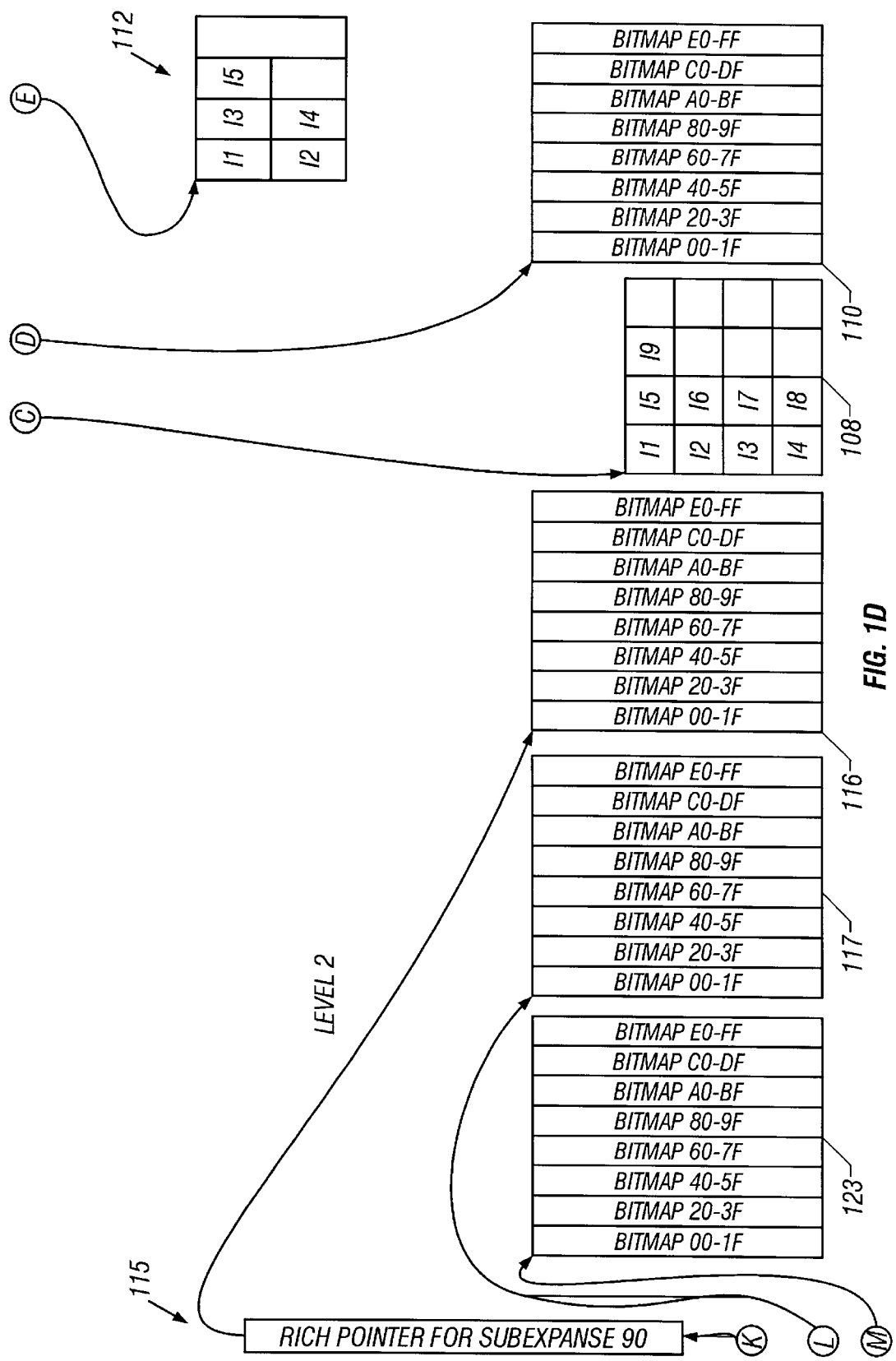
Figure 1E:
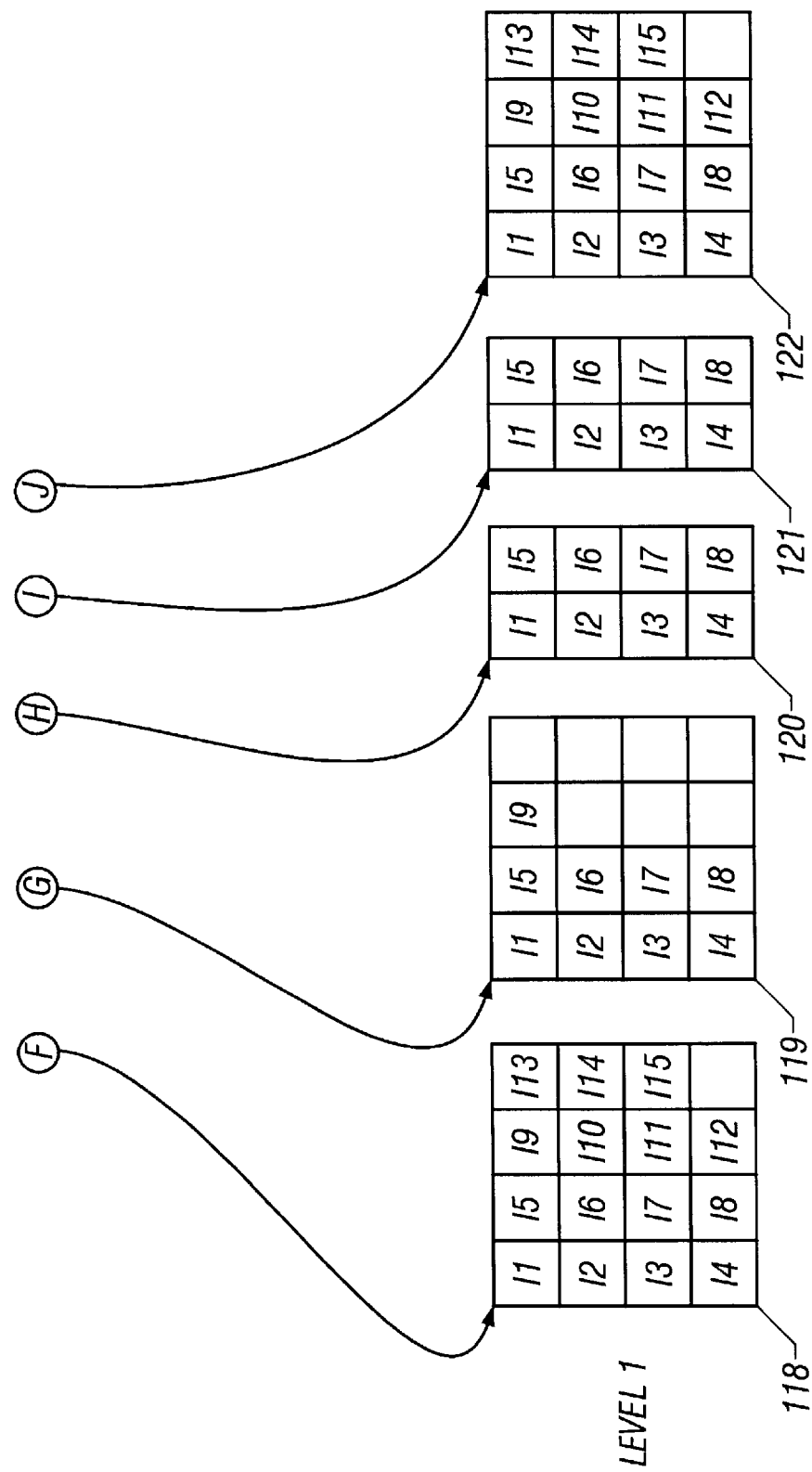

The present invention includes a system for and a method of storing data in a computer memory for access by an application program which is executed on a data processing system. The system includes a data structure and associated information which is stored in the memory and includes a root pointer which points to a "wide/shallow" digital tree having a plurality of nodes in the form of branches (branch nodes) and multi-index leaves (leaf nodes), arranged hierarchically, that are adaptively compressed using hybrid abstract data types (ADTs). In this application an ADT refers to multiple data structures with the same virtual meaning but with different literal expansions. Further, the term "index" as used herein encompasses a key or set of fields constituting a key including a number, string, token, symbol or other such designation or representation.

A digital tree implementation allows the data (set of indexes or keys) to be organized primarily "by expanse" rather than purely "by population", which has various benefits for simplifying tree traversal and modification algorithms. In particular, a wide digital tree has potentially high fan-out at each branch, which allows the tree to be shallow, hence fast to traverse, even for large populations; thus "well-scalable". Use of compressed branches largely preserves the performance benefit of wide branches while allowing their actual fan-out, hence memory usage, to shrink to match the data (indexes or keys) being stored. Using this technique, only populated subexpanses from among all possible subexpanses of a branch, that is, those containing stored indexes, must be represented in compressed branches; empty subexpanses are typically (although not necessarily) absent.

Further, storing multiple indexes (or keys) and their associated values, if any, in a "multi-index leaf" makes the tree shallower by one or more levels, hence both smaller in memory usage and faster to access. Compressed multi-index leaves hold more indexes rather than having to insert more branches in the tree to hold the same set of indexes. Such "cache efficient" compressed branches and leaves are designed optimally with respect to CPU cache lines to minimize "cache fills" that result in relatively slow access to random access memory (RAM).

Thus, the invention includes several types of branch and leaf compressions to optimize performance of a data structure such as a digital tree. These improvements include linear and bitmap branches (i.e., interior nodes), linear and bitmap leaves (i.e., terminal nodes), and rules and methods for effectuating use of these nodes including, for example, a global, memory-efficiency-driven, opportunistic decompression of compressed branches, and use of leaf index compression.

Linear branch nodes according to the invention address low-fanout branches by providing a list of populated subexpanses (i.e., index digits) and corresponding next-level pointers. More generally, a linear branch contains a list of subexpanse descriptors that contain criteria for selecting a subexpanse corresponding to a key or one or more of a set of fields constituting a key. According to a preferred embodiment of the invention, the subexpanse descriptors are 1-byte segments of 32-bit indexes. Preferably, linear branches are constrained to a single CPU cache line of the target platform. As the subexpanse becomes more heavily populated, a bitmap branch node may be used including a binary vector indicating which subexpanses are populated (i.e., are not empty) followed by a list of pointers to the populated subexpanses (or an equivalent multi-level data structure).

Linear leaf nodes according to the invention are likewise directed to low populations of indexes by using multi-index leaves containing lists of valid indexes. The lists may have associated value areas for respective indexes of the multi-index leaves. For medium to high population densities at low levels in the tree, bitmap leaf nodes provide a binary vector of valid indexes, possibly including value areas corresponding to each valid index.

The invention further incorporates global, memory-efficiency-driven, opportunistic decompression of compressed branches. According to this aspect of the invention, when an entire data set stored in the data structure occupies less memory used per index than some threshold value (possibly measured in bytes per index) or when the population of the subexpanse under a linear or bitmap branch is sufficiently high, even if the global metric is not adequate, linear and/or bitmap branches are replaced with an uncompressed form of the branch (i.e., an uncompressed branch node) resulting in less computation and fewer cache fills to traverse the level, albeit at the cost of some additional memory. Using this option in the case of larger populations of indexes, particularly data having well-clustered indexes, the invention "amortizes" excess memory needed to maintain fast access to the indexes and any related data.

Note the degree of symmetry between branches and leaves, that is, between linear branches and linear leaves and also between bitmap branches and bitmap leaves. This symmetry is most apparent in the embodiment wherein each index is mapped to an associated value. The interior nodes of the tree map portions (digits) of indexes to pointers to subsidiary nodes, while the terminal nodes of the tree map fully decoded indexes to value areas that, in practice, often contain the addresses of, that is, pointers to, caller-defined objects external to the tree. This symmetry fails, however, in that there is no leaf equivalent to an uncompressed branch. When a higher-level leaf exceeds a specific population, it is converted to a subtree under a new branch, or else or to a lower-level, more-compressed leaf (as described below), as appropriate. When a lowest-level linear leaf exceeds a specific population, it is converted to a bitmap leaf.

According to another aspect of the invention, the fact that a portion of a target index is decoded at each level of a digital tree is further leveraged to compress leaf indexes. Because indexes are partially decoded while traversing the tree, only the remaining undecoded portion of each index need be stored in the leaves, the number of bits or bytes constituting this undecoded portion shrinking at each lower level. The result is that a lower-level leaf (i.e., a leaf more distant from the root) stores more indexes in the same space as a higher level leaf, the latter requiring more bits to represent the larger undecoded portion of each index. Hence, even worst-case index insertions and deletions are localized and do not cascade more than one level down or up the tree, respectively, minimizing worst-case insertion and deletion time. Note that this type of compression is most applicable to fixed-size indexes but less useful for variable-size indexes such as character strings or bit strings.

It should be noted that it is possible to compress a digital tree such that bits common to multiple keys (indexes) are skipped (not represented). Such trees must store copies of whole keys, of whatever fixed or variable size, in their leaf nodes to disambiguate the leaves (except in rare cases in which disambiguation is not required). This is distinguishable from leaf compression implemented by the invention, wherein decoded portions of indexes, whether required for tree traversal or skipped (compressed out) as being common to all indexes in a subexpanse, are always stored in and recoverable from the branch nodes and need not be stored in leaf nodes.

The invention provides an appropriate combination (hybrid) of various cache-efficient ADTs for branches and leaves, the combination depending upon an unpredictable data set (indexes or keys) to be stored in one instance, and results in a wide digital tree that is both memory-efficient and fast to access or modify over a wide dynamic range. A wide dynamic range means over small to large data sets: few to many (billions of) indexes or keys; and types of data sets: indexes or keys that are sequential, clustered, periodic, or random. A well-designed hybrid digital tree with a wide dynamic range can be represented at the software interface as a simple dynamic array with no initialization, tuning, or configuration necessary (or even possible).

The invention may be implemented using a wide range of constructs for traversing a data structure including pointers and other schemes for linking nodes and/or providing for traversal of the data structure. For purposes of illustration, a preferred embodiment of the invention may be implemented within a construct of a digital tree including an enhanced pointer as fully described in U.S. application Ser. No. 09/457,164, now pending, entitled "SYSTEM FOR AND METHOD OF CACHE-EFFICIENT DIGITAL TREE WITH RICH POINTERS," the disclosure of which is hereby incorporated herein by reference. Such a pointer may take a first form as shown in FIG. 2A when used as a null pointer or to point to a branch or leaf node, or as shown in FIG. 2B when containing immediate indexes. Use of rich pointers provides for designation of the type of object being pointed to, e.g., linear or bitmap, branch or leaf, etc. Alternate embodiments of the invention may use other constructs such as conventional pointers and, for example, use the least significant bits of the pointer itself (recognizing that the pointers might point to 8-byte-aligned objects so that the least significant three bits are not otherwise used) to identify the target object, or provide that the pointed-at object self-identify (that is, type information is stored in the child node rather than in the parent).

As shown in FIG. 2A, the basic pointer structure on, for example, a 32-bit platform, includes two 32-bit words, one entire word used by a pointer to redirect tree traversal flow to another node, a Decoded Index of between zero and 2 bytes, a Population field of between 1 and 3 bytes, and a Type field of 1 byte. For a null pointer, all bytes except the Type field are zero. Otherwise, the first word is a pointer to a subsidiary branch or leaf node. The Decode and Population fields together fill all but 1 byte of the second word.

A pointer construct containing immediate indexes is shown in FIG. 2B, eliminating the need to redirect or point to another node to access the indexes. As explained in the referenced patent application, still other variations of these pointer constructs may be used to associate values with respective indexes, while adaptations are provided to accommodate various machine word sizes.

The present invention uses these pointers to form ADTs including branches, i.e., interior nodes and leaves, i.e., terminal nodes. According to this data structure, a digital tree includes some combination of branch nodes (linear, bitmap or uncompressed) and leaf nodes (linear or bitmap). Each branch is a literal (uncompressed) or virtual (linear or bitmap) array of pointers, preferably 256 such rich pointers. That is, each node has a fanout of up to 256 subexpanses.

In the preferred embodiment indexes are decoded 8 bits, that is 1 byte, at a time. In other words, each digit is 1 byte, and the real or virtual fanout of each branch node is 256. It should be apparent to one of ordinary skill in the art that a digital tree can have any fanout in its branch nodes, even fanouts which are not a power of 2, such as 26 when the tree decodes a simple 26-character alphabet. A binary tree is normally a divide-by-population tree (referred to as a binary storage tree) in which keys are compared with whole key values stored in each node. However, a binary tree can also be a divide-by-expanse (binary digital) tree with a fanout of 2 in which each digit is 1 bit. Furthermore, a hybrid tree may have varying fanouts at different branches or levels. However, the inventors of the present invention have discovered that a consistent fanout of 256, that is, a digit size of 1 byte, is most efficient because computers naturally process byte-sized objects efficiently, in addition to word-sized objects.

Compressed branches include linear and bitmap, supplementing the uncompressed type branch. This latter branch type supports conventional digital tree functions using, for example, an array of 256 subexpanse pointers. When the actual fanout (i.e., number of populated subexpanses) is relatively limited, as is typically true when a new branch is created during index insertion, a "compressed" branch is instead used. This compressed branch may be viewed as a virtual array of 256 subexpanse pointers, but requiring much less memory (although often requiring two cache fills to traverse the associated node rather than one for reasons explained below.)

Referring to FIGS. 1A–1E, root pointer node 101 is used for accessing the underlying data structure of the digital tree. Root pointer node 101 includes address information diagrammatically shown as an arrow pointing to a first or "top" level node 102, in this illustration, a branch node. (Note, the terminology used herein assumes a 32-bit implementation wherein indexes are single words, as opposed to character strings, and thereby labels the top node of a tree pointed to by the root as "level 4", children of the level 4 node are designated as "level 3" nodes, etc. On a 64-bit machine, the root pointer points to a level 8 node, children of which are at level 7, etc. Thus, the level of any branch or leaf node is equal to the number of digits (bytes) remaining to decode in the indexes stored at or below that node. This numbering scheme further has the advantage of making the lowest levels of both 32-bit and 64-bit trees the same, thereby simplifying source code required for use with trees of varying sizes. It is further noted that this convention, while representative, is for purposes of the present explanation and other conventions may be adopted including, for example, designating leaf nodes as constituting a highest (e.g., fourth) level of the tree.) Top level node 102 is an uncompressed branch node that includes an array of 256 rich pointers for referencing up to 256 lower level nodes and represents the entire expanse of the data structure, i.e. indexes 00000000 through FFFFFFFF hex. Top level node 102 includes a first rich pointer 103 (also referred to as an adaptable object) which corresponds to expanse 00000000–00FFFFFF and points to a linear branch 105 at level 3. Another rich pointer 104 is shown corresponding to a final expanse portion including indexes FF000000–FFFFFFFF. Rich pointer 104 points to the most significant upper $1/256$th of level 3 and an uncompressed branch 106.

The first subexpanses of Level 3 include a subsidiary node in the form of linear branch 105. As shown, linear branch 105 includes a fanout (NumRP=the count of the number of child nodes referenced by the branch), a sorted list of index portions (digits) corresponding to the subexpanses referenced by the branch, and a list of pointers to the indicated subexpanses. In the present illustration, only the pointer to the final subexpanse listed as E4 and representing the subexpanse including 00FD00000 through 00FDFFFF is shown, although similar pointers emanating from the slots for subexpanses E1 through E3 would also be present but are not shown. Thus, the fourth rich pointer of linear branch 105 is shown referencing bitmap branch 113 of level 2 which, in turn references linear leaves 118–122 and bitmap leaves 116, 117 and 123

On the high order end of node 102, uncompressed branch 106 at level 3 is referenced by rich pointer 104. Typically, uncompressed branch 106 would reference a large number of subordinate nodes, although only two such references are shown for purposes of illustration. Note that sparsely populated branches would otherwise be converted into a linear or bitmap branch format to conserve memory but still provide access to the node using one or two cache line fills.

As shown in FIGS. 1A–1E, level 3 uncompressed branch 106 includes an array of 256 rich pointers including rich pointer 107 to level 1 linear leaf node 108. Note that the use of the rich pointer according to one implementation of the invention allows the pointer to "skip" a level of the tree (i.e., in this case, level 2) to avoid an unused indirection when an intermediate branch would contain a single reference. Another rich pointer 109 points to level 2 linear leaf node 110 including two, 2-byte indexes.

A rich pointer may be used to implement a data structure compatible with and further incorporating branch and leaf compression according to the present invention. While not required, use of rich pointers is compatible with and supports one implementation of the present invention. Such a rich pointer structure encompasses at least two types of rich pointers or adaptable objects including a pointer type as described above as depicted in FIG. 2A and an immediate type depicted in FIG. 2B. The immediate type supports immediate indexes. That is, when the population of an expanse is relatively sparse, a rich pointer can be used to store the indexes "immediately" within a digital tree branch, rather than requiring traversal of the digital tree down to the lowest level to access the index. This format is akin to the "immediate" machine instruction format wherein an instruction specifies an immediate operand which immediately follows any displacement bytes. Thus, an immediate index or a small number of indexes are stored in the node, avoiding one or more redirections otherwise required to traverse the tree and arrive at some distant leaf node. Immediate indexes thereby provide a way of packing small populations (or small number of indexes) directly into a rich pointer structure instead of allocating more memory and requiring multiple memory references and possible cache fills to access the data.

A two-word format of the preferred embodiment readily supports the inclusion of immediate indexes. Within the rich pointer, this is accomplished by storing index digits in the entirety of the rich pointer excepting the type field. A rich pointer implemented in a 32-bit system may store anywhere from a single 3-byte immediate index up to seven 1-byte indexes, while a rich pointer in a 64-bit system may store up to 15 1-byte immediate indexes. The generalized structure of a rich pointer (also referred to as an adaptable object) supporting immediate indexes is shown in FIG. 2B. The rich pointer includes one or more indexes "I", depending on the word-size of the platform and the size of the index, and an 8-bit Type field that also encodes the index size and the number of immediate indexes.

FIG. 3 illustrates details of a linear branch construct according to the invention as implemented on a 32-bit platform. The linear branch consists of one byte indicating the fanout, i.e., number of populated subexpanses referenced by the branch (NumRP), followed by a sorted array consisting of 1 byte (i.e., digit) per populated subexpanse indicating the subexpanse number (e.g., 0 through 255). The number of populated subexpanses is followed by a corresponding array of subexpanse pointers. The invention incorporates some padding at the end of the two arrays which allows them to "grow in place" for faster insertions and deletions. Both of the subexpanse arrays (i.e., digits and pointers) are organized or packed purely by population, not addressed uniformly by expanse but can be thought of as being organized or accessed by expanse.

Typically, a linear branch node as shown in FIG. 3 is used when the actual fanout, that is, the number of populated subexpanses, is relatively small, for example up to seven rich pointers out of a possible 256 subexpanses per branch. The linear branch node according to one implementation of the invention includes the previously mentioned three consecutive regions, including a count of populated subexpanses, a sorted list of populated subexpanses (1 byte each) and a list of corresponding rich pointers, each two words in length. (As recognized by those of ordinary skill in the art, other configurations of numbers, types, sizes and ordering of regions may be employed in alternative implementations of the invention.) Using this particular scheme, a maximum linear branch including seven rich pointers requires 1 byte for the number of subexpanses and 7 bytes for the subexpanse list, hence two words (on a 32-bit system) for the combination. The combination of count and subexpanse list is followed by fourteen words for the rich pointers themselves, the entire construct fitting in sixteen words or one cache line total. Referring back to FIG. 3, a total of 4 populated subexpanses are referenced by pointers for E[xpanse]1 through E[xpanse]4, respectively.

Figure 4:
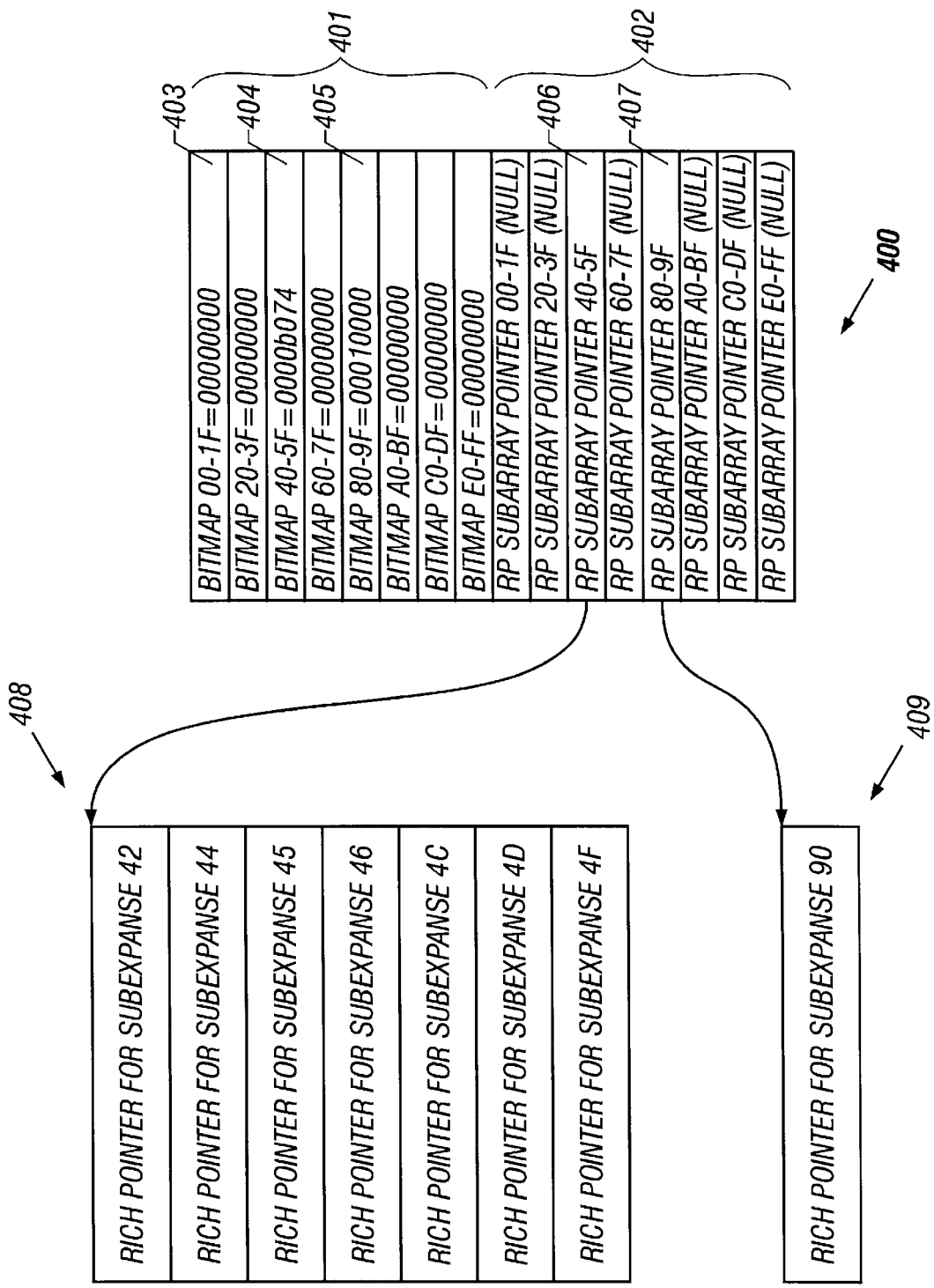
FIG. 4 is a diagram of an example of a bitmap branch.

FIG. 4 illustrates a bitmap branch, again as implemented on a 32-bit word size platform. The bitmap branch node has a first portion 401 including 256 bits (32 bytes) indicating populated and empty subexpanses, followed by a second portion 402 including ordinary pointers to independent subarrays of rich pointers to the populated subexpanses. This construct may be thought of as compressing the byte-per-valid-index required in a linear branch to a bit-per-any-index, a potential savings of up to $7/8$, except that a bitmap contains 0 bits for invalid indexes. In concept, the subexpanse pointers are held in a simple array (portion 402) following the bitmap. However, according to a preferred embodiment of the invention, so as to keep memory management simple and insertion and deletion fast, the bitmap may be followed by eight ordinary pointers, each to an independent subarray 408, 409 of between zero and 32 subexpanse pointers. The bitmap is thereby organized by expanse, since it is addressable by the digit (0 . . . 255), while the subexpanse pointers are listed "by population", since the latter are packed into subarrays corresponding only to the bits that are set in the bitmap.

In another embodiment of the invention, once any bitmap branch subarray of rich pointers reaches maximum memory usage, that is, a number of pointers (i.e., populated subexpanses) such that the amount of memory allocated to the subarray is sufficient to hold 32 subexpanse pointers, the subarray is made uncompressed to save time during accesses, insertions, and deletions. Uncompressing a rich pointer subarray means setting all of the bits in the corresponding subexpanse of the bitmap, even for subexpanses of indexes which are unpopulated; unpacking the rich pointer subarray to be a simple, positionally-accessed array; and representing unpopulated subexpanses with null rich pointers.

Thus, as shown in FIG. 4, the bitmap branch is a 2-tier object, somewhat more complex than either a linear or uncompressed branch. The first level (portion 401) is the bitmap itself, according to a 32-bit word size implementation of the invention, including 256 bits (32 bytes) subdivided into 8 subexpanses, followed by 8 pointers (portion 402) to second-level ADTs or subarrays (e.g., arrays 408 and 409). Each ADT 400 consists of a packed linear list of rich pointers, one rich pointer for each bit set in the associated bitmap. On a 32-bit system, 8 words are required for the bitmap (32/4) and 8 words for the pointers, for a total of 16 words. This latter total of 16 words is important to system performance as it is equal to one CPU cache line according to a preferred implementation of the invention. Note that on a 64-bit system, only 4 words would be needed for the bitmap, while 8 words would still be needed for the pointers, so that 4 words are wasted assuming again a 16 word cache line.

For example, bitmap 404 has a hex value of 0000b074, which provides the following binary vector and index values:

Leaf compression is also utilized according to the invention in the form of multi-index leaves including the aforementioned linear and bitmap leaf types. Typically, each lookup in one branch of a digital tree reduces the expanse or range of the indexes that can possibly be stored under the next lower subexpanse pointer. Therefore, only the respective unique remaining bits not yet decoded need be stored. As previously explained, when the population (i.e., number of valid indexes) in an expanse is small, it becomes useful to store the indexes in a single object that is sequentially or otherwise immediately searchable, rather than proceeding hierarchically through more tree branches to application-specific leaves, each related to a single index. According to one implementation, in its simplest case, an indexes-only leaf is a list of valid indexes.

The inventors have experimentally determined that an optimal size of a leaf is relatively small, e.g., less than or equal to two cache lines, i.e., 32 words or 128 bytes on a

TABLE 1

| 5 | 5 | 5 | 5 | 5 | 5 | 5 | 5 | 5 | 5 | 5 | 5 | 5 | 5 | 5 | 5 | 4 | 4 | 4 |
|---|---|---|---|---|---|---|---|---|---|---|---|---|---|---|---|---|---|---|
| F | E | D | C | B | A | 9 | 8 | 7 | 6 | 5 | 4 | 3 | 2 | 1 | 0 | F | E | D |
| 0 | 0 | 0 | 0 | 0 | 0 | 0 | 0 | 0 | 0 | 0 | 0 | 0 | 0 | 0 | 0 | 1 | 0 | 1 |
| 4 | 4 | 4 | 4 | 4 | 4 | 4 | 4 | 4 | 4 | 4 | 4 | 4 | | | | | | |
| C | B | A | 9 | 8 | 7 | 6 | 5 | 4 | 3 | 2 | 1 | 0 | | | | | | |
| 1 | 0 | 0 | 0 | 0 | 0 | 1 | 1 | 1 | 0 | 1 | 0 | 0 | | | | | | |

According to this example, the binary vector represented in the bottom row of Table 1 indicates the presence of indexes within subexpanses including subexpanses 42, 44, 45, 46, 4C, 4D and 4F within the range $40_{hex}$ to $5F_{hex}$. The associated ordinary pointer 406 for this range (FIG. 4) points to array 408 which includes individual rich pointers to each of the subexpanses corresponding to the subexpanses indicated by the associated binary vector.

Figure 5:
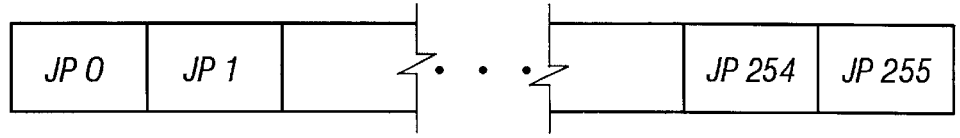
FIG. 5 is a diagram of an uncompressed branch.
Figure 6A:
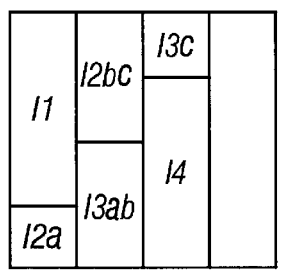
FIGS. 6A–6D are diagrams of examples of linear leaves for structures referencing only indexes.
Figure 6B:
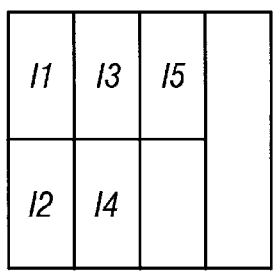
Figure 6C:
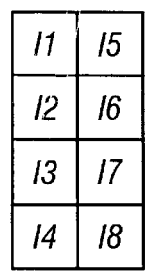
Figure 6D:
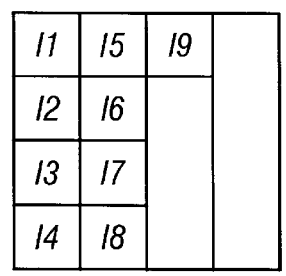

For comparison an uncompressed branch is depicted in FIG. 5. This construct comprises a simple array of rich pointers, in this case 256 such rich pointers, with null rich pointers used to represent empty expanses. Assuming again 2 words per rich pointer, such uncompressed branches require 512 words.

The invention further supports global memory efficiency. That is, when fanout (i.e., the number of populated subexpanses) increases to a point where a linear branch occupies too many cache lines (according to one preferred embodiment of the invention, this limit is a single 16 word cache line), the branch is converted to a bitmap branch. Note that such a bitmap construct can handle "full fanout" and need never be converted to an uncompressed branch. Neither linear nor bitmap branches waste any memory on null subexpanses. However, when the population under a linear or bitmap branch is high enough to "amortize" the memory required for an uncompressed branch, or the overall or global memory efficiency of the data structure (preferably measured in bytes per index) still do not exceed some selected, "tunable" value, the branch is opportunistically converted to an uncompressed type. While this wastes some memory on null subexpanse pointers, it ensure a single indirection (and cache fill) to traverse the branch. Note, to support the latter parameter, that is global memory efficiency, at least in a higher population tree the root pointer may point to an intermediate data structure that stores the total number of bytes used by the tree and the total count of indexes stored in the tree. This intermediate data structure may reside adjacent to the top branch node of the tree or point in turn to the top branch of the tree.

typical 32-bit word size platform. It has been found that even a serial search of a sorted list of indexes in two full cache lines takes, on average, 1.5 cache fills (assuming that the data is not already in cache), since half of the time the index is found in the first cache line (1 fill) and half the time in the second line (2 fills). That is, when a population is sufficiently small, it has been found that it is preferable to store it as a list, bitmap, or other ADT of indexes in one to two cache lines, rather than in more levels of a digital tree.

FIGS. 6A–6D and 7A–7C show examples of linear leaves according to the invention. A linear leaf is an ordered list of indexes, each consisting of N undecoded bytes, where N is the level in the tree using a convention wherein the lowest level, i.e., the level furthest from the root, is level 1. (Note that this is opposite of how trees are conventionally described wherein level numbering starts at the topmost node at level 1, each child being at a level numbered higher than a level of its parent.) According to a preferred implementation, the population of the leaf (count of indexes equals the size of the leaf) is stored with the pointer to the leaf, not in the leaf itself (with the exception of an implementation used for very small arrays that consist entirely of a single root-level linear leaf.)

Figure 7A:
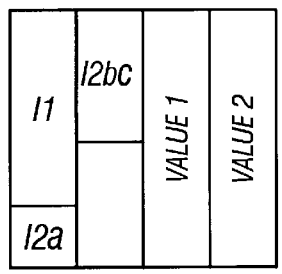
FIGS. 7A–7C are diagrams of examples of linear leaves for structures having values associated with respective valid indexes stored in the structure.
Figure 7B:
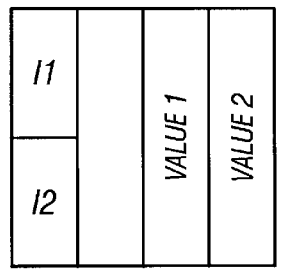
Figure 7C:
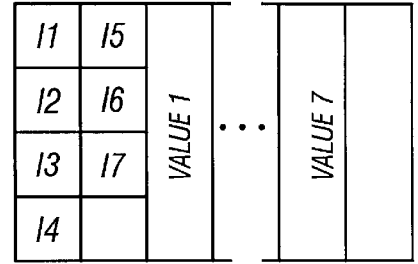

As shown in FIGS. 6A–6D, the linear leaf is a packed array of sorted indexes that stores, for each index, only the minimum number of bytes remaining to be decoded at the level of the leaf in the tree. FIGS. 7A–7C depict alternative implementations used when values are associated with respective indexes, so that a separate value area is added including a list of such values. Also note that, unlike the root-level leaf, the linear leaves need not include a population field for an index count. Instead, according to a preferred embodiment of the invention, the parent node carries the population field.

Table 2 includes arrangements and capacities of leaves at various levels of a tree (lower level leaves requiring more bytes to represent the remaining portion of the index) for 32 and 64-bit word size platforms, and for systems having values associated with the indexes.

TABLE 2

| Index Only | | Values Associated with Indexes | | |
|---|---|---|---|---|
| 32-bit | [64-bit] | 32-bit | [64-bit] | Index Size |
|  | [3 . . . 36] |  | [2 . . . 34] | [7-byte indexes] |
|  | [3 . . . 42] |  | [2 . . . 36] | [6-byte indexes] |
|  | [4 . . . 51] |  | [2 . . . 39] | [5-byte indexes] |
|  | [4 . . . 64] |  | [2 . . . 42] | [4-byte indexes] |
| 3 . . . 42 | [6 . . . 85] | 2 . . . 36 | [3 . . . 46] | 3-byte indexes |
| 4 . . . 64 | [8 . . . 128] | 2 . . . 42 | [4 . . . 51] | 2-byte indexes |
| 8 . . . 24 | See text | 4 . . . 25 | [8 . . . 25] | 1-byte indexes |

Note that, in each case, the index size of a leaf, i.e., the number of remaining undecoded bytes in each index, is enumerated in the Type field of the referencing rich pointer structure. The minimum leaf populations are based on how may indexes an immediate rich pointer can hold so that smaller populations are "immediatized", i.e., stored in the rich pointer structure itself. In contrast, the maximum leaf populations are limited by the capacity of two cache lines (e.g., 32 words) in the case of index-only leaves, or four cache lines (e.g., 64 words) in the case of leaves in which values are associated with indexes. According to another implementation of the invention on a 64-bit platform, an indexes-only leaf is reconfigured from an immediate indexes type directly to a bitmap leaf upon reaching sixteen indexes so as to avoid creating a linear leaf for a single population size and then a bitmap leaf upon the next insertion, reaching seventeen indexes, in the same subexpanse.

Bitmap leaves are useful when the memory cost of a linear leaf exceeds a particular threshold, for example, upon reaching the aforementioned 17 indexes. Thus, at the lowest level of the tree, where there is only a single index digit (e.g., byte) remaining to decode, a 256-index subexpanse has sufficient population (e.g., 17 indexes), memory is conserved by representing the leaf as a bitmap with 1 bit for each index in the subexpanse, hence 256 total bits or 32 bytes. An example of an indexes-only bitmap leaf implemented on a 32-bit word platform is presented in FIG. 8. In the figure, each horizontal rectangle represents one word. On a 64-bit platform, the leaf would appear similar except that the words are larger and there are half as many words in the bitmap. The bits in the bitmap indicate which of the possible indexes in the expanse of the leaf are actually present, that is, stored.

Figures 8, 9:
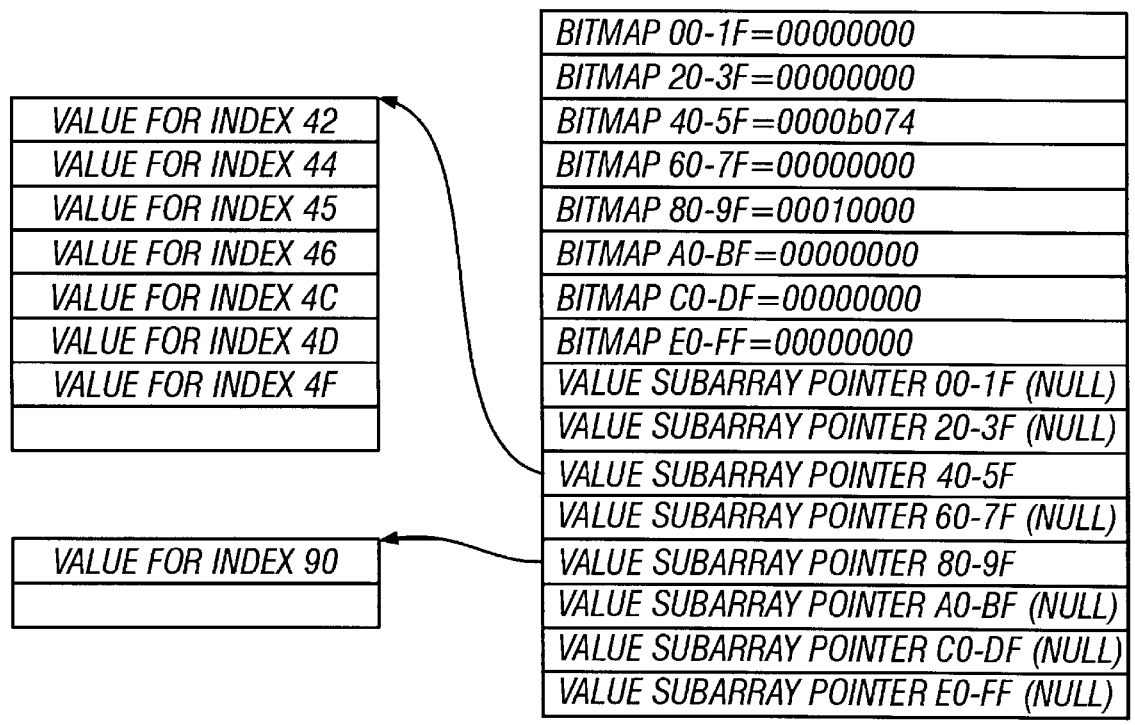
FIG. 8 is a diagram of a bitmap leaf structure for structures referencing only indexes.
FIG. 9 is a diagram of a bitmap leaf structure including values associated with respective indexes.

FIG. 9 is a diagram of an alternate embodiment in which the subject data structure associates values with the stored indexes. As shown, a value area including one word per valid index is included in the bitmap leaf. Similar to a bitmap branch, this embodiment of the bitmap leaf is a 2-tier construct, except that the rich pointer arrays (with two words per element) are instead value area subarrays, that is, lists of values, having one word per element. On a 64-bit platform, the bitmap would instead require four words, with four words being unused. The result of using a 2-tier construct is that value list modification is faster because fewer bytes of memory and cache lines are involved.

Similar to bitmap branches, when an expanse is sufficiently small, for example, 256-way nodes with 8 bits or 1 byte remaining to decode, and the population of the expanse is sufficiently large, e.g., equal to or greater than 25 indexes, it has been determined that it is advantageous (i.e., "cheaper in terms of memory") to represent the valid indexes in the expanse as a bitmap rather than as a list of indexes. This characteristic holds true only at level 1 of the tree (i.e., at leaves farthest from the root node) with just one undecoded byte per index. According to a preferred embodiment of the invention, use of bitmap leaves may be limited to level 1 leaves, that is, for indexes containing only one undecoded byte.

The invention further includes leaf-index compression. As previously described in connection with linear leaves, traversing a digital tree involves decoding index bits (digits) representing portions (e.g., 1-byte segments) of a target index being sought, inserted or deleted. In many cases, upon reaching a leaf, some or most of the bits in the index stored at the leaf have already been decoded, that is, stored positionally (i.e., digitally) in the tree. Thus, only the remaining undecoded index bits (the suffix) must be stored in the leaf. Thus, on a 32-bit platform with 4-byte indexes decoded 1 byte at a time (i.e., at each branch of the tree), a (terminal) leaf having a size of two 64-byte wide cache lines (i.e., 128 bytes) might accommodate the number of compressed indexes shown in Table 3.

TABLE 3

| Maximum Number of Compressed Indexes per Leaf | Conditions |
|---|---|
| 128/4 = 32 | disjoint 4-byte indexes (no common leading bits) |
| 128/3 = 42 | 3-byte indexes each with 1 leading byte in common (already decoded) |
| 128/2 = 64 | 2-byte indexes each with 2 leading bytes in common (already decoded) |
| 128/1 = 128 | 1-byte indexes each with 3 leading bytes in common (already decoded) |

Referring to Table 3, in the case of 1 byte per index, once the population exceeds twenty-four indexes, a 32-byte (i.e., 256 bit) object is sufficient to hold a bitmap representing all of the 256 possible indexes in a low-level leaf. Also note that leaf-index compression has additional advantages. In particular, each lower-level leaf in the tree can hold more indexes than a current-level leaf so that, even without immediate indexes, a cascade caused by inserting a single index which overflows an existing leaf never creates more than one additional level in the tree. Similarly, a decascade caused by deleting a single index never deletes more than one level in the tree. In other words, leaf compression supports good locality of changes during modification.

As previously noted, while the preferred embodiment has been described in terms of a fixed size index, it may be readily modified to accommodate indexes of variable sizes such as character strings and bit strings of arbitrary length. For example, using character strings of arbitrary length as indexes, a unique remaining suffix portion of a single index, if sufficiently small, may be stored immediately in a rich pointer or, if longer, stored in a variable size single-index suffix leaf.

Figure 10:
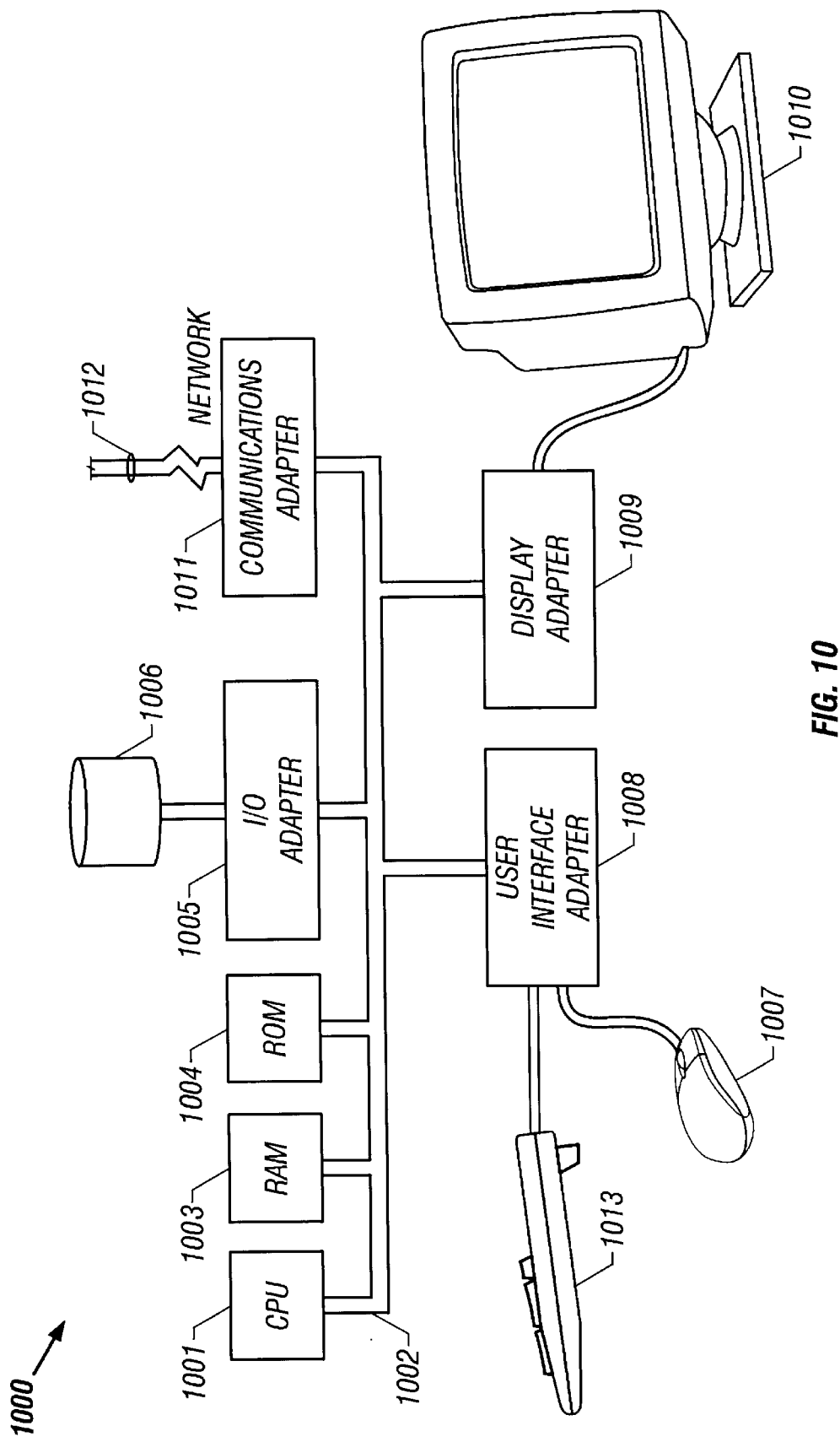
FIG. 10 is a block diagram of a computer system on which the subject digital tree may be implemented.

FIG. 10 is a diagram of a computer system capable of supporting and running a memory storage program implementing and maintaining a data structure according to the invention. Thus, although the present invention is adaptable to a wide range of data structures, programing languages, operating systems and hardware platforms and systems, FIG. 10 illustrates one such computer system 1000 comprising a platform suitable to support the present invention. Computer system 1000 includes Central Processing Unit (CPU) 1001 coupled to system bus 1002. CPU 1001 may be any general purpose CPU, such as an HP PA-8500 or Intel Pentium processor. However, the present invention is not restricted by the architecture of CPU 1001 as long as CPU 1001 supports the inventive operations as described herein, e.g., the use of pointers. System bus 1002 is coupled to Random Access Memory (RAM) 1003, which may be SRAM, DRAM or SDRAM. ROM 1004 is also coupled to system bus 1002, which may be PROM, EPROM, or EEPROM. RAM 1003 and ROM 1004 hold user and system data and programs as is well known in the art.

System bus 1002 is also coupled to input/output (I/O) controller card 1005, communications adapter card 1011, user interface card 1008, and display card 1009. The I/O card 1005 connects to storage devices 1006, such as one or more of a hard drive, a CD drive, a floppy disk drive, a tape drive, to the computer system. Communications card 1011 is adapted to couple computer system 1000 to network 1012, which may be one or more of a telephone network, a Local (LAN) and/or a Wide-Area (WAN) network, an Ethernet network, and/or the Internet network and can be wire line or wireless. User interface card 1008 couples user input devices, such as keyboard 1013 and pointing device 1007, to computer system 1000. Display card 1009 is driven by CPU 1001 to control display device 1010.

While the invention has been described in connection with what is presently considered to be the preferred embodiment, it is to be understood that the invention is not limited to the disclosed embodiment, but, on the contrary, is intended to cover various modifications and equivalent arrangements included within the spirit and scope of the appended claims.

What is claimed is:

1. A data structure for storage in a computer memory, said data structure accessible by an application program being executed on a data processing system, said data structure comprising:
   a root pointer; and
   a digital tree pointed to by said root pointer, comprising a first plurality of nodes arranged hierarchically, a second plurality of said nodes including:
      a branch node selected from the group consisting of a linear, bitmap and uncompressed branch node selected according to a number of populated subexpanses and an overall status of the digital tree, and
      a leaf node selected from the group consisting of linear and bitmap leaf nodes, each holding a plurality of indexes and containing only undecoded index bits according to a level of the leaf in the digital tree and a number of indexes in the leaf.

2. The data structure according to claim 1 wherein said second plurality of nodes includes said linear, bitmap and uncompressed branch nodes.

3. The data structure according to claim 1 wherein said second plurality of nodes includes said linear and bitmap leaf nodes.

4. The data structure according to claim 1 wherein said second plurality of nodes constitutes said first plurality of nodes.

5. The data structure according to claim 1 further comprising a computer readable media having stored therein said digital tree.

6. The data structure according to claim 1 wherein said linear branch node comprises at least two linear lists, the first list including a subexpanse descriptor including at least the corresponding index bits of each associated populated subexpanse, and the second list including pointers to one or more subsidiary nodes for each associated subexpanse, said pointers corresponding to said subexpanse descriptor of said first list.

7. The data structure according to claim 6 wherein each of said pointers comprises a rich pointer.

8. The data structure according to claim 1 wherein said bitmap branch node comprises at least a first list of bits including one bit for each possible subexpanse under the bitmap branch node, each said bit indicating if the corresponding subexpanse is populated by any indexes, and a second list of pointers pointing to at least one subsidiary node for each of said subexpanses, said pointers corresponding to a status of said bits in said first list.

9. The data structure according to claim 8 wherein each of said pointers comprises a rich pointer.

10. The data structure according to claim 8 wherein said bitmap is subdivided into sections and said list of pointers is similarly subdivided into a plurality of independent subarrays, each said subarray pointed to by a single corresponding pointer in a third list accompanying the bitmap.

11. The data structure according to claim 10 including logic configured to independently convert said subarrays to an uncompressed form in response to filling said subarrays to their respective maximum memory usage.

12. The data structure according to claim 1 wherein said linear leaf node comprises at least a list of indexes reduced to respective unique remaining bits not yet decoded higher in the digital tree.

13. The data structure according to claim 1 wherein said bitmap leaf node comprises at least a first list of bits including one bit for each possible index in the leaf, each said bit indicating if a corresponding one of said indexes is valid.

14. The data structure according to claim 13 wherein said bitmap leaf node comprises a list of values corresponding to valid ones of said indexes and said bitmap is subdivided into sections and said list of values is similarly subdivided into a plurality of independent subarrays, each said subarray pointed to by a single corresponding pointer in a third list accompanying the bitmap.

15. The data structure according to claim 1 wherein said data structure includes fields storing a total population and a total memory used by said data structure.

16. A method of storing an index in a data structure, comprising the steps of:
    identifying a compressed branch node of the data structure under which the index belongs, wherein said compressed branch node comprises one of a linear branch node and a bitmap branch node;
    determining a parameter of said data structure, said parameter comprising one of an overall memory used per index value for the data structure, and a population under said compressed branch node;
    in response to said value, selectively converting said compressed branch node to an uncompressed branch node; and
    storing the index under said uncompressed branch node.

17. The method according to claim 16 wherein said data structure is stored in a computer memory so as to be accessible by an application program being executed on a data processing system, said data structure comprising:
    a root pointer; and
    a digital tree pointed to by said root pointer, comprising a plurality of nodes arranged hierarchically, each of said nodes including one of:
       a branch node selected from the group consisting of said compressed branch node and said uncompressed branch node; and
       a leaf node selected from the group consisting of linear and bitmap leaf nodes, each holding a plurality of indexes and containing only undedoded index bits according to a level of the leaf in the digital tree and a number of indexes in the leaf.

18. A method of storing data in a data structure in a computer memory, said data structure accessible by an application program being executed on a data processing system, said data structure comprising a root pointer and a digital tree pointed to by said root pointer, said digital tree comprising a plurality of nodes arranged hierarchically, said method comprising the steps of:

identifying a number of populated expanses in said digital tree;

identifying an overall status of said digital tree;

selectively creating, in response to said identifying steps, a branch node selected from the group consisting of a linear, bitmap and uncompressed branch node;

identifying a level of a leaf node to be created in said digital tree;

identifying a number of indexes in said leaf node to be created; and creating said leaf node in response to said steps of identifying said level of said leaf node and said step of identifying said number of indexes in said leaf node including selecting a type of said leaf node from the group consisting of linear and bitmap leaf nodes, each holding a plurality of indexes and containing only undecoded index bits according to a level of the leaf in the digital tree and a number of indexes in the leaf.

19. A computer memory for storing data for access by a computer program being executed on a data processing system, comprising:

a data structure stored in said computer memory, said data structure accessible by an application program being executed on a data processing system, said data structure including a root pointer; and a digital tree pointed to by said root pointer, comprising a plurality of nodes arranged hierarchically, each of said nodes including one of a branch node selected from the group consisting of a linear, bitmap and uncompressed branch node selected according to a number of populated sub-expanses and an overall status of the digital tree, and a leaf node selected from the group consisting of linear and bitmap leaf nodes, each holding a plurality of indexes and containing only undecoded index bits according to a level of the leaf in the digital tree and a number of indexes in the leaf.

* * * * *

UNITED STATES PATENT AND TRADEMARK OFFICE
CERTIFICATE OF CORRECTION

PATENT NO. : 6,654,760 B2
DATED : November 25, 2003
INVENTOR(S) : Douglas L. Baskins et al.

It is certified that error appears in the above-identified patent and that said Letters Patent is hereby corrected as shown below:

Column 17,
Line 1, delete "undedoded" and insert therefor -- undecoded --

Signed and Sealed this

Twelfth Day of April, 2005

JON W. DUDAS
*Director of the United States Patent and Trademark Office*